(12) United States Patent
Francois (10) Patent No.: US 10,146,185 B2
(45) Date of Patent: Dec. 4, 2018

(54) EXTERNAL ELEMENT WITH A LIGHT SENSOR

(71) Applicant: The Swatch Group Research and Development Ltd, Marin (CH)

(72) Inventor: Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/519,041

(22) PCT Filed: Dec. 10, 2015

(86) PCT No.: PCT/EP2015/079290
§ 371 (c)(1),
(2) Date: Apr. 13, 2017

(87) PCT Pub. No.: WO2016/096616
PCT Pub. Date: Jun. 23, 2016

(65) Prior Publication Data
US 2017/0242402 A1    Aug. 24, 2017

(30) Foreign Application Priority Data

Dec. 15, 2014    (EP) .................................... 14198049

(51) Int. Cl.
*G04F 13/02*    (2006.01)
*G04B 47/06*    (2006.01)
*G01J 1/50*    (2006.01)
*G04G 21/02*    (2010.01)
*G01J 1/42*    (2006.01)

(52) U.S. Cl.
CPC .............. *G04B 47/06* (2013.01); *G01J 1/429* (2013.01); *G01J 1/50* (2013.01); *G04G 21/02* (2013.01); *G04F 13/02* (2013.01)

(58) Field of Classification Search
CPC .......... G04F 13/02; G04F 13/04; G04F 13/00; G04F 3/08; G04F 3/00; G04B 47/063; G04B 47/046; G04B 47/04; G04B 47/06; G01J 1/429; G01J 1/50; G04G 21/02
USPC ........................................................... 368/327
See application file for complete search history.

(56) References Cited

U.S. PATENT DOCUMENTS

| | | | |
|---|---|---|---|
| 5,387,798 A | 2/1995 | Funakoshi et al. | |
| 5,581,090 A | 12/1996 | Goudjil | |
| 6,437,346 B1 * | 8/2002 | Goudjil ..................... | G01J 1/50 250/372 |
| 8,897,100 B2 * | 11/2014 | Joo .......................... | G04F 3/06 368/109 |

(Continued)

FOREIGN PATENT DOCUMENTS

| | | |
|---|---|---|
| CH | 670 185 | 5/1989 |
| EP | 0 562 201 A1 | 9/1993 |
| FR | 2 695 722 A1 | 3/1994 |

(Continued)

OTHER PUBLICATIONS

International Search Report dated Feb. 22, 2016, in PCT/EP2015/079290 filed Dec. 10, 2015.

*Primary Examiner* — Sean Kayes
(74) *Attorney, Agent, or Firm* — Oblon, McClelland, Maier & Neustadt, L.L.P.

(57) ABSTRACT

An external element of a timepiece including a frame made of a first material, the external element further including at least one light sensor.

17 Claims, 5 Drawing Sheets

(56) References Cited

U.S. PATENT DOCUMENTS

2011/0222375 A1    9/2011   Tsubata et al.

FOREIGN PATENT DOCUMENTS

JP          53-86274    A    7/1978
WO     WO 99/14573   A1    3/1999

* cited by examiner

EXTERNAL ELEMENT WITH A LIGHT SENSOR

The present invention relates to an external timepiece element including a frame made of a first material, said external element further including at least one light sensor.

BACKGROUND OF THE INVENTION

There are known portable objects, such as watches, equipped with sensors for detecting ultraviolet or UV rays. These devices include a semiconductor ultraviolet sensor consisting of a GaAsP component associated with a UV filter.

One drawback of these semiconductor ultraviolet sensors is that they have a lag time in the display and they are expensive. Moreover, because these sensors are electronic, it is undesirable to use them in a mechanical watch.

Another known possibility consists of a bracelet or watchband made of plastic, wherein said plastic includes a photochromic pigment, i.e. which changes colour with light. These photochromic pigments can be selected to be sensitive to different wavelengths, including ultraviolet wavelengths.

One drawback of this type of bracelet or watchband is that it is in a single colour and the variation in colour with the level of UV light is around this single colour. This means that a bracelet whose initial colour is green will vary in shade from a pale green to a dark green according to the intensity of ultraviolet light.

One drawback of this type of product is that the indication is not precise since it is difficult to associate a specific shade with a level of ultraviolet light.

SUMMARY OF THE INVENTION

The invention concerns an external element that overcomes the aforementioned prior art drawbacks by proposing a portable object capable of providing a light indication in a readable and reliable manner, while being simple to implement.

To this end, it is an object of the invention to provide an external timepiece element including a frame made of a first material, said external element further including at least one light sensor, characterized in that said light sensor consists of a light guide comprising an input section orienting a light towards a multitude of chromic sections, the chromic sections incorporating a photochromic pigment sensitive to a specific wavelength, each section being arranged so that said photochromic pigment reacts to a specific radiation intensity of the specific wavelength so that said pigment changes from a first colour to a second colour when said specific radiation intensity is attained and in that the pigment concentration is different between each section.

This external element provided with at least one light sensor according to the invention has the advantage of being easy to read since a change in colour indicates a crossing of the luminous intensity threshold. Further, the use of an energy-intensive electronic system is avoided.

In a first advantageous embodiment, the sections are arranged in increasing order from the lowest luminous intensity to the highest luminous intensity.

In a second advantageous embodiment, the sections are arranged so that the section reacting to the lowest luminous intensity has the lowest concentration of pigment and the concentration increases as a function of luminous intensity.

In a third advantageous embodiment, said sections all have the same first colour.

In a fourth advantageous embodiment, said sections all have the same second colour.

In a fifth advantageous embodiment, said sections are devised such that their second colour allows for shading when they have all changed from the first colour to the second colour.

In a sixth advantageous embodiment, the input section includes microstructures allowing light to be oriented towards the chromic sections.

In another advantageous embodiment, the chromic sections are coated with an anti-ultraviolet protective layer so that the light entering said sections only enters through the input section.

In another advantageous embodiment, the frame includes at least one hollow in which the disc is arranged.

In another advantageous embodiment, the frame is a bezel.

In another advantageous embodiment, the frame is a crystal.

In another advantageous embodiment, the frame is the middle part of a watch case.

In another advantageous embodiment, the frame is a bracelet or watchband.

In another advantageous embodiment, the bracelet includes two bracelet strands made of plastic materials, said light sensor being arranged on at least one of the two strands.

In another advantageous embodiment, the bracelet includes a plurality of links hinged to each other, said light sensor being arranged on at least one link.

In another advantageous embodiment, said bracelet is closed by a deployant buckle clasp, said light sensor being arranged on said clasp.

In another advantageous embodiment, the frame is a crown.

In another advantageous embodiment, said photochromic pigment is selected to react to ultraviolet radiation.

BRIEF DESCRIPTION OF THE DRAWINGS

The advantages of an external element of this type will appear clearly upon reading the following description and on examining the illustrative drawing, in which.

DETAILED DESCRIPTION

The present invention concerns an external element 1 of a timepiece or watch 100.

Figure 1:
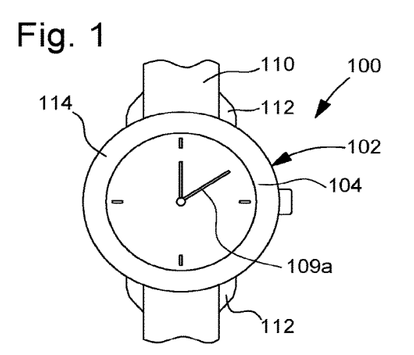
FIGS. 1 and 2 show schematic views of a timepiece according to the present invention.
Figure 2:
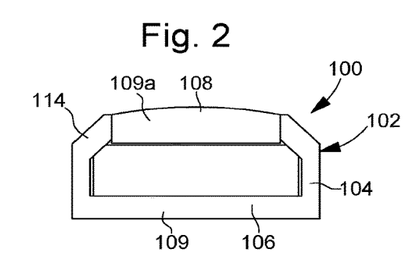

Timepiece 100, seen in FIGS. 1 and 2 is, for example, a wristwatch and includes a case 102. This case is formed by a case middle 104 closed by a back cover 106 and a crystal 108. This timepiece also includes a bracelet or watchband 110. The latter is fixed to the case middle via two pairs of horns 112. The bracelet may be formed of two bracelet strands, each strand being fixed to a pair of horns and connected to the other strand via a clasp.

External element 1 includes a frame made of a first material. This first material may be a metallic or plastic material.

At least one light sensor 120 is arranged on said frame. This light sensor is used to enable the user to view the current luminous intensity with respect to a reference. Indeed, the UV index, used to provide information about ultraviolet radiation intensity, is known. A minimum threshold thus exists, on the basis of which information about ultraviolet radiation intensity can be seen.

Advantageously according to the invention, the light sensor includes at least one photochromic disc 122. This photochromic disc is mainly composed of a photochromic pigment, like those defined in U.S. Pat. No. 520,813A, which is dispersed in an organic or inorganic matrix. This matrix is a binder serving as a support for the pigment.

Such a photochromic pigment has a first colour and changes colour to a second colour when the radiation intensity reaches a value specific to said pigment. Here, this will be ultraviolet radiation intensity with wavelengths from 100 to 400 nm.

This feature makes it possible to visually indicate the crossing of an ultraviolet radiation intensity threshold.

In a preferred embodiment, the light sensor can display a scale of luminosity. To achieve this, the light sensor includes a plurality of photochromic discs 122. Each piezochromic disc includes a pigment reacting at a specific intensity. Consequently, each disc 122 changes colour when a specific radiation intensity is reached. To achieve a scale of luminosity, the specific intensities of discs 122 will be increasing intensities.

Thus, when the user carrying the portable object goes in the sun, the discs gradually change colour providing a visual indication. These discs 122 may be adhesive bonded to each other or spaced apart.

In a preferred variant, the various discs forming the scale of luminosity all have a first colour, i.e. an identical colour at rest. This means that at a level of luminosity below the minimum threshold, all the discs have the same colour.

In another preferred variant, the various discs forming the scale of luminosity all have a second colour, i.e. an identical colour, when their specific threshold is reached. This means that at a maximum measurable luminosity, all the discs will have the same colour.

In another preferred variant, the various discs forming the scale of luminosity all have an identical first colour but are made such that they do not all have an identical second colour to allow for shading. More specifically, the discs are devised such that, when they form a scale of luminosity, the first discs to change colour have a lighter second colour than the last discs to change colour. For example, the first discs become yellow and the last become red. This provides a double indication: the user not only knows that the luminosity is increasing since the number of discs changing colour is increasing, but he also knows that he is close to a maximum intensity since the colour is varying and becoming darker and darker.

It will be understood here that the photochromic pigment is of the reversible type. This means that when the pigment reaches or exceeds a specific luminosity threshold, it changes colour, passing from a first colour to a second colour. However, this also means that when luminosity passes below the specific threshold again, the pigment changes from the second colour to the first colour.

The matrix used for the pigment dispersion may be of various types.

A first matrix category includes inks, lacquers and paints. This matrix consists of an elastomeric binder mixed with at least one solvent, a plasticiser and a dispersing agent. Such a matrix may be a crosslinked polyurethane.

A second matrix category includes thermoplastic granules. This matrix consists of a resin mixed with at least one dispersing agent and a plasticiser.

A third matrix category includes rubber mixture. This matrix consists of an elastomer mixed with at least charges?, a dispersing agent and a vulcanization system. This category can then produce inserts comprising said photochromic pigment to form a mosaic.

A fourth matrix category includes thermosetting mixtures. These mixtures consist of a liquid resin mixed with at least one dispersing agent.

It is therefore possible to obtain a disc taking the form of a transparent organic/inorganic insert (polymethyl methacrylate), acrylic resin, epoxy, untreated glass with the chemical formula $SiO_2$ or $Al2O3$ or C). This insert may be silkscreened onto a surface using a photochromic pigment-based ink or the photochromic ink may be dispersed in the material forming the insert.

Figure 3:
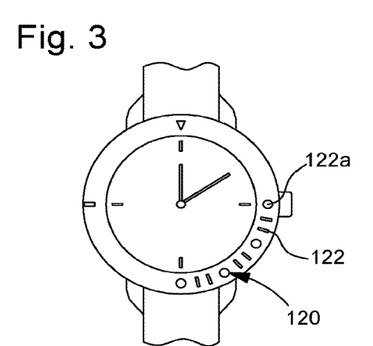
FIGS. 3 and 4 show schematic views of a bezel forming the external element according to the present invention.
Figure 4:
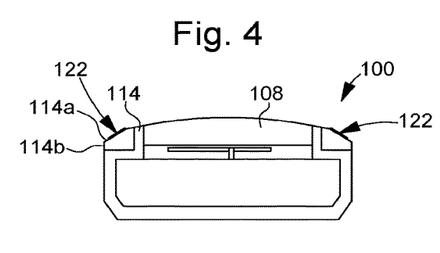

In a first implementation, the external element is a bezel 114 as see in FIGS. 3 and 4. This bezel 114 may be a rotating bezel or a fixed bezel. In the case of a fixed bezel, the bezel may be a ring secured to the case middle so that it cannot rotate, or be directly incorporated in case middle 104 and thereby form a case middle-bezel.

Such a bezel 114 has an upper wall 114a which is the face seen by the user and a vertical wall 114b allowing the user to rotate the bezel in the case of a rotating bezel.

In this embodiment, discs 122 including the photoelectric pigments are arranged on the upper wall 114a serving as the visible face.

In the case where discs 122 take the form of an ink or paints, these discs are silkscreened onto said upper wall. A scale may also be silkscreened to associate a number indication with these photochromic discs. Of course, important values, such as 500 Lux, 1000 Lux, 20000 Lux and 100000 Lux could also be displayed by different discs 122a.

In the case where the discs take the form of inserts, upper wall 114a of bezel 114 includes hollows (not represented). The number of hollows is identical to the number of inserts. The inserts can then be placed and secured in the hollows by adhesive bonding, for example. However, it is also possible to over-mould the inserts in the hollows. This then produces a bezel having a bimaterial appearance when a metal bezel has rubber inserts.

Light sensor 120 may be arranged on a quarter of the bezel or a third or a half-bezel.

Figure 5:
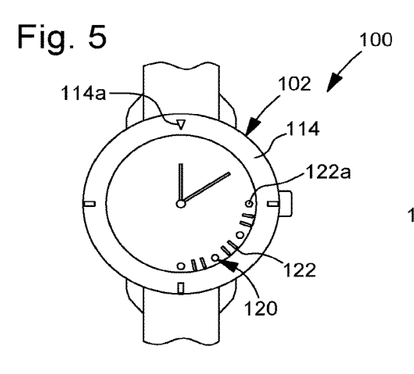
FIGS. 5 and 6 show schematic views of a crystal forming the external element according to the present invention.
Figure 6:
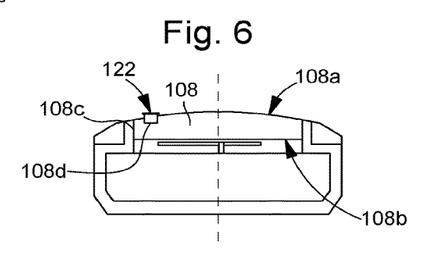

In a second embodiment seen in FIGS. 5 and 6, the external element is the crystal 108 of the portable object. This crystal 108 is secured to case middle 104 and has an upper face 108a, a lower face 108b and a lateral edge 108c for attachment.

In this second embodiment, photochromic discs 122 are arranged on upper face 108a of the crystal. It would be possible to place them on the lower face, if the transparent material selected allowed UV radiation to pass through.

In the case where discs 122 take the form of an ink or paint, these discs are silkscreened onto said upper face 108a. A scale may also be silkscreened to associate a number indication with the photochromic discs. This scale may also be silkscreened on the bezel.

In a variant, the crystal has hollows 108d of very small thickness. These hollows allow the photochromic ink to be placed therein while ensuring a perfectly smooth surface of crystal 108, thereby reducing the risk of said ink being chipped off by shocks.

In the case where discs 122 take the form of inserts, the upper face 108a of crystal 108 includes hollows 108d. The number of hollows is identical to the number of inserts. The inserts can then be placed and secured in the hollows by adhesive bonding, for example. However, it is also possible to over-mould the inserts in the hollows. A crystal with a bimaterial appearance is thus obtained.

It is possible, in both cases, for photochromic discs 122 to be arranged on the upper face of the crystal but for the luminosity numbers to be placed on the dial or underneath the crystal.

Figures 7, 8:
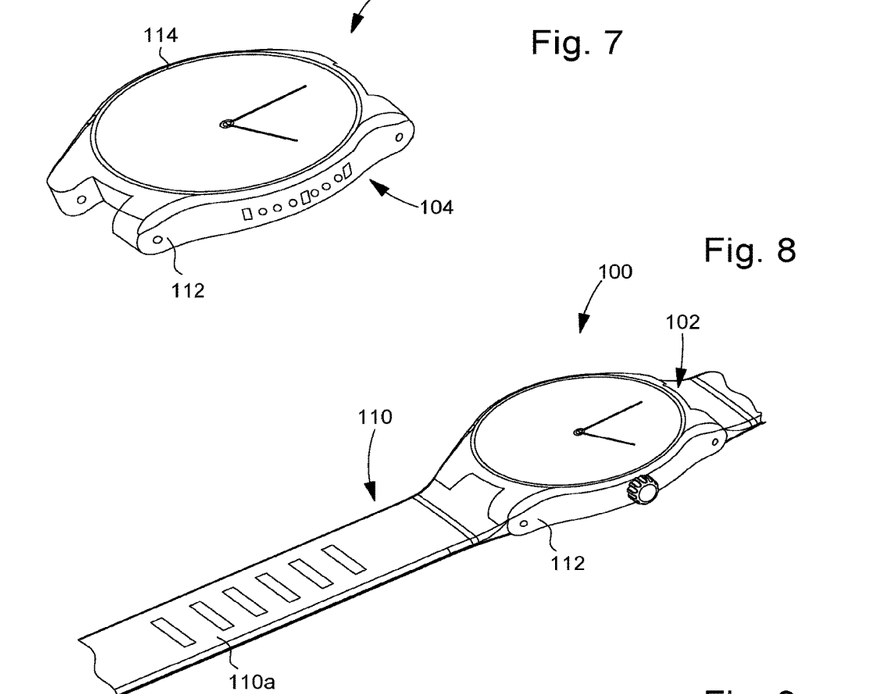
FIG. 7 is a schematic view of a case middle forming the external element according to the present invention.
FIG. 8 is a schematic view of a bracelet strand forming the external element according to the present invention.

In a third embodiment, visible in FIG. 7, exterior element 30 is the case middle 104 of the portable object.

As in the first and second embodiments, photochromic discs 122 in the form of ink or inserts are arranged directly on the case middle or in the hollows in said case middle. Luminosity indicator numbers may be silkscreened onto or etched into the case middle.

In a fourth embodiment, the external element is the bracelet or watchband 110. Indeed, the timepiece is provided with a bracelet secured to the case middle via two pairs of horns.

In a first case seen in FIG. 8, bracelet 110 is formed of two bracelet strands 110a, each strand being secured to a pair of horns 112 and connected to the other strand via a clasp 111. Preferably, bracelet strands 110a are made of rubber or plastic.

There are several possible solutions for the arrangement of photochromic discs 122.

A first solution consists in using ink pellets and in depositing this ink on the surface of a bracelet strand.

A second solution consists in using disc inserts and placing and securing these inserts in hollows made in the bracelet link.

A third solution consists in using ink pellets and in depositing this ink on a flexible support. This flexible support is then inserted inside the bracelet strand so that the discs are visible.

Figure 9:
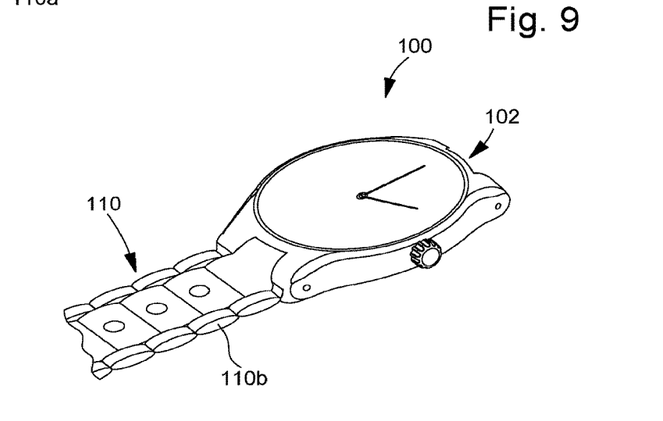
FIG. 9 shows a schematic view of links of a bracelet strand forming the external element according to the present invention.

In a second case, visible in FIG. 9, the bracelet is made of metal and is then formed of a plurality of links 110b attached to each other by means of pins. This makes it possible to obtain links 110b that can carry the photochromic discs and can pivot with respect to each other.

This bracelet strand also comprises a clasp. The clasp is shown here in the form of a deployant buckle 111. This deployant buckle is generally formed of three parts 111a, 111b, 111c such as side bars hinged to each other. Two of these parts are secured to a link.

These parts forming the deployant buckle are thus devised to be hinged to each other such that they can lie one atop the other, these three parts 111a, 111b, 111c then forming one part. This configuration makes it possible to lengthen the bracelet momentarily for attachment to the user's wrist.

Photochromic discs in the form of ink or inserts are then arranged in links 110b of said bracelet, directly on the bracelet or inside hollows therein.

Preferably, each link 110b carries a photochromic disc.

Even more preferably, photochromic discs are arranged on the links placed between the pair of horns at 6 o'clock and the deployant buckle. Indeed, when a timepiece is on the user's wrist, the links located between the pair of horns at 6 o'clock and deployant buckle are the most accessible to the user. The user only needs to turn his wrist slightly to see them. They are even more visible when the user's arms are placed on a table or a desk. This arrangement avoids overloading the visual display on the dial by having discs on the crystal or the bezel while still offering good visibility.

Figure 10:
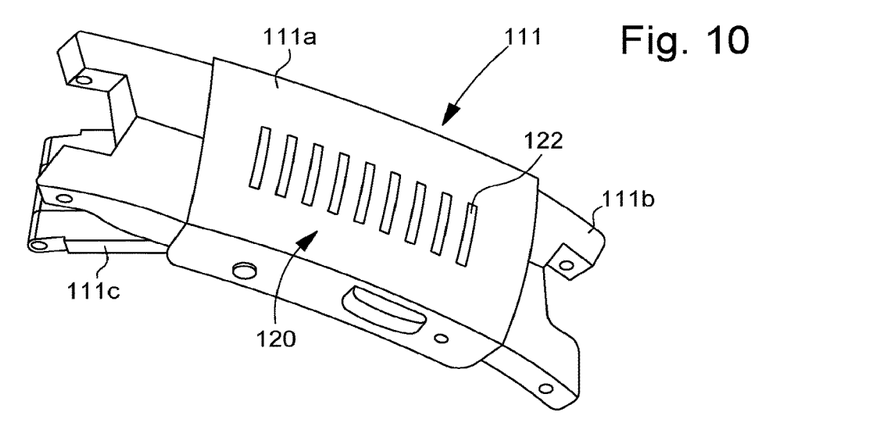
FIGS. 10 to 11 show schematic views of a bracelet clasp forming the external element according to the present invention.
Figure 11:
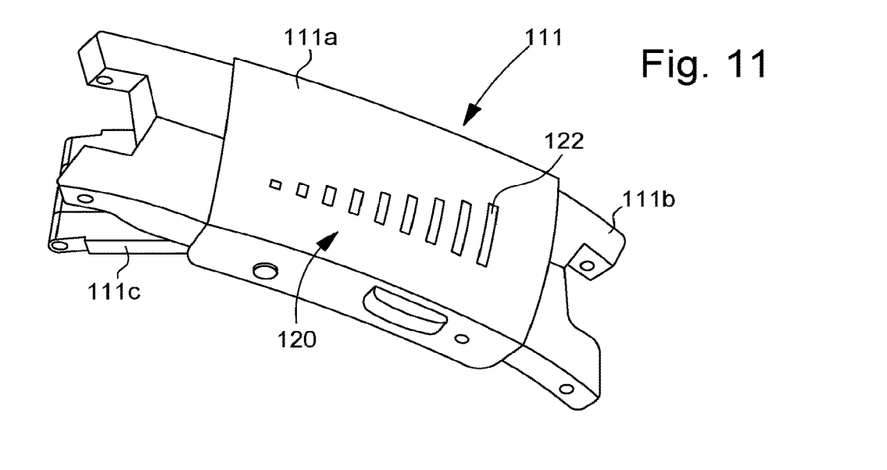
Figure 12:
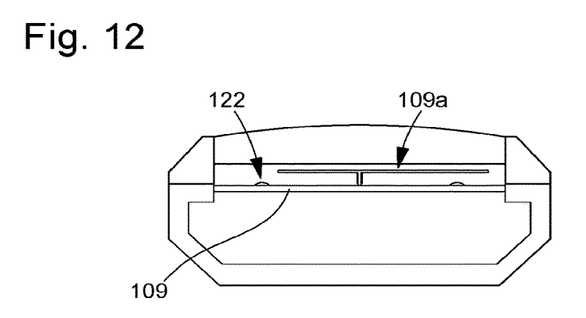
FIGS. 12 and 13 show schematic views of a dial forming the external element according to the present invention.

In a fifth embodiment seen in FIGS. 10 to 12, the external element is clasp 111, i.e. the deployant buckle of the bracelet. This deployant buckle is generally formed of three parts such as side bars which hinged to each other. Two of these parts are secured to a link. These parts forming the deployant buckle are thus devised to be hinged to each other such that they can lie one atop the other, the three parts then forming a single part. For some deployant buckle models, one of the parts acts as the main part 111a, since it is this part that accommodates the other two parts 111b, 111c; this main part is the part visible from the exterior. From the exterior, the user therefore sees one part in the form of a metal plate on which markings, such as the brand name, can for example be engraved.

Advantageously, the present invention uses this surface for the light sensor arrangement. Photochromic discs are thus disposed on this surface of central part 111a of the deployant buckle as seen in FIG. 10.

Photochromic discs may be aligned and associated with a scale of indicator numbers. It is, however, possible for the discs to be configured to have different sizes according to luminosity as seen in FIG. 11. For example, the discs may take the form of bars of increasing size as the radiation intensity increases. Consequently, the user is able to obtain reliable information without indication numbers.

Figure 13:
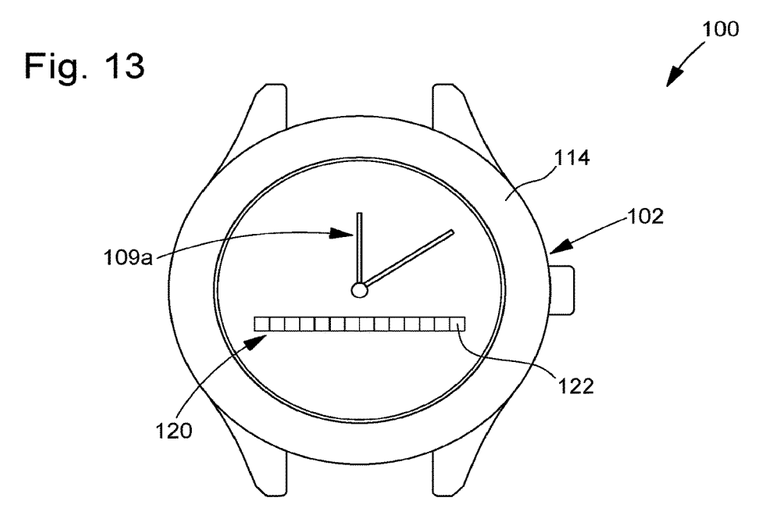

In a sixth embodiment seen in FIGS. 12 and 13, the external element is the timepiece dial. Indeed, given that the timepiece crystal is, in theory, sufficiently transparent, it is possible to envisage depositing the photochromic disc(s) directly on the dial. This configuration advantageously avoids any risk of damage linked to scratches or shocks.

This embodiment is possible if crystal 108 is not provided with a filter coating so that the totality of the rays of the specific wavelength can be captured by said photochromic discs 122.

Figure 14:
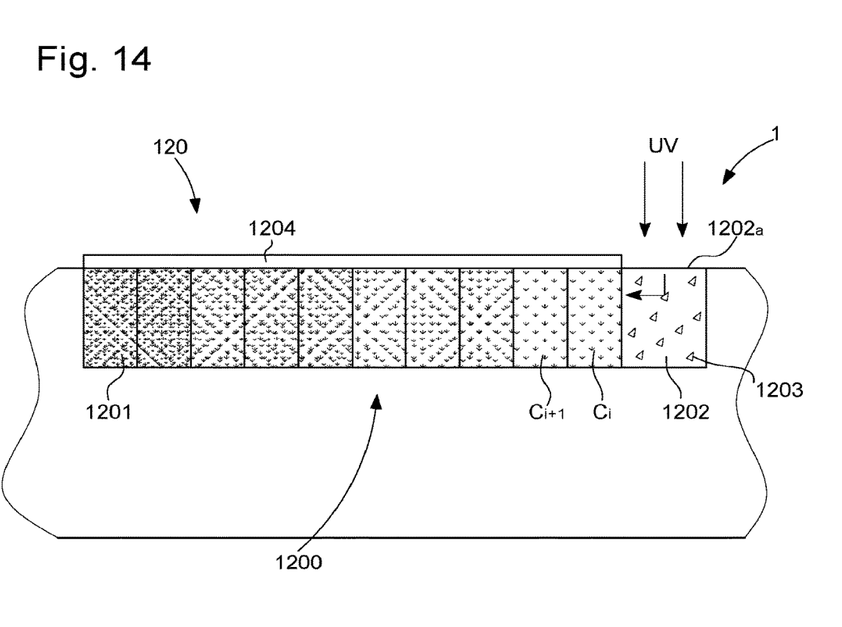
FIG. 14 is a schematic view of a second embodiment of the present invention.

In a second embodiment seen in FIG. 14, light sensor 120 consists of a light guide 1200. This light guide 1200 is composed of a multitude of discs which take the form here of sections 1201 joined or bonded to each other. The various sections 1201 may be of identical or different wavelengths, as required. Cleverly, each section 1201 is made of a suitable material for a light guide, such as sapphire or plastic such as polymethyl methacrylate and is manufactured such that photochromic pigments are integrated in the material. Light sensor 120 is thus devised so that each section 1201 has a different concentration Ci of photochromic pigments to achieve an increasing concentration $C_i$. This configuration allows the light sensor to operate as follows.

Operation consists of recognising a light beam entering the light guide. An input section 1202 can be used for this purpose. Input section 1202 includes microstructures 1203 arranged in said section to guide light from the exterior towards the other sections. The other sections 1201 are arranged from the lowest to highest concentration so that the section with the lowest concentration $C_i$ is located just after input section 1202. In this manner, according to the luminous intensity, the luminous flux will pass through the different sections 1201 until it reaches the section 1201 having the pigment that reacts with its specific intensity. It is understood that the more the luminous flux progresses from section 1201 to section, the more light is diffused and the more the flux loses intensity. Thus, the higher the intensity of the luminous flux that enters input section 1202, the higher the intensity in sections 1201, the higher the number of pigments that react and the higher the number of sections 1201 that darken. The selected approach also makes it possible to have a colour gradient in the sections that is proportional to the gradient of luminous intensity.

In one example, the external element is a bezel. This bezel includes a hollow, inside which light sensor 120 is arranged. This light sensor includes here eleven sections 1201 distributed comprising an input section and ten sections 1201 integrating the photochromic pigment. Input section 1202 picks up light via upper face 1202a which is the visible face and includes microstructures 1203 allowing the light beam to be oriented at 90° towards the other sections. Given the configuration of the sections, the sections incorporating photochromic pigments will be coated with an anti ultraviolet protective layer (anti uv) 1204 with a thickness comprised between 15 mu and 150 mu, preventing the latter from penetrating inside sections 1201 via the upper face thereof.

In one example embodiment, the minimum concentration will be 0.05%, while the maximum concentration will be 1.5%. The interval between each section 1201 could be comprised within a range of 1 mm to 5 mm and preferably 1 mm to increase resolution.

Of course, the variants of the first embodiment also apply to this embodiment, such as, for example, colour management, as all the sections may have the same first colour, or the same second colour, or a different second colour or shading.

It will be clear that various alterations and/or improvements and/or combinations evident to those skilled in the art may be made to the various embodiments of the invention set out above without departing from the scope of the invention defined by the annexed claims.

Thus, it is possible to envisage that the photochromic pigment is sensitive to radiation of another wavelength, such as infra-red or the visible spectrum. It is also possible to have a light sensor that can preferably detect UV-A rays whose wavelength varies from 400 to 315 nm or UV-B rays whose wavelength varies from 315 to 280 nm, or even UV-C rays whose wavelength varies from 280 to 100 nm.

It is also possible to have several light sensors with each sensor sensitive to a specific wavelength. It is then possible to obtain a portable object which could be capable of detecting UV-A rays whose wavelength varies from 400 to 315 nm or UV-B rays whose wavelength varies from 315 to 280 nm, or even UV-C rays whose wavelength varies from 280 to 100 nm.

In another variant, the disc combines the photochromic function with another function. For example, phosphorescent pigments could be used for applications in diver's watches to obtain visibility for the light sensor. In that case, the phosphorescent layer will be arranged underneath the photochromic layer. The photochromic layer could then be arranged to be sensitive to a first range of wavelengths and the phosphorescent layer to be sensitive to a second range of wavelengths. For example, the photochromic pigment could react to wavelengths from 280 to 400 nm and the phosphorescent pigment located underneath the photochromic pigment to wavelengths from 100 to 250 nm. Consequently, in daytime, the photochromic pigment changes from the transparent state to the coloured state for a UV level indication, whereas at night, the photochromic pigment is in the transparent state allowing the phosphorescent pigment to display an hour circle and thus indicate time information. In another example, it is possible to envisage the use of thermochromic pigments, also permitting reaction to a critical temperature threshold caused by the luminous intensity on the sensor.

The invention claimed is:

1. An external element of a timepiece comprising:
a frame made of a first material;
at least one light sensor formed of a light guide comprising an, input section orientating a light, from a direction of light incidence, towards a multitude of chromic sections, the chromic sections incorporating a photochromic pigment sensitive to a specific wavelength,
each chromic section configured such that the photochromic pigment reacts to a specific radiation intensity of specific wavelength so that the photochromic pigment changes from a first color to a second color when the specific radiation intensity is reached and a pigment concentration is different between each section,
the chromic sections configured along a perpendicular direction to the direction of light incidence, the chromic sections being arranged aside with respect to the input section, the pigment concentration in each chromic section increasing from an input section side, and
the chromic sections are coated with an anti-ultraviolet protective layer so that the light entering the chromic sections only enters through the input section.

2. The external element according to claim 1, wherein the chromic sections are arranged in increasing order from lowest ultraviolet radiation intensity to highest ultraviolet radiation intensity.

3. The external element according to claim 2, wherein the chromic sections are arranged so that a chromic section reacting to a lowest ultraviolet radiation intensity has a lowest concentration of the photochromic pigment and the pigment concentration increases as a function of ultraviolet radiation intensity.

4. The external element according to claim 1, wherein the chromic sections all have a same first color at a rest state.

5. The external element according to claim 4, wherein the chromic sections all have a same second color from a specific ultraviolet radiation threshold.

6. The external element according to claim 4, wherein the chromic sections are devised such that the second color produces shading when the chromic sections have all changed from the first color to the second color.

7. The external element according to claim 1, wherein the input section includes microstructures allowing the light to be oriented towards the chromic sections.

8. The external element according to claim 1, wherein the frame includes at least one hollow in which the light sensor is arranged.

9. The external element according to claim 1, wherein the frame is a bezel.

10. The external element according to claim 1, wherein the frame is a crystal.

11. The external element according to claim 1, wherein the frame is a middle part of a watch case.

12. The external element according to claim 1, wherein the frame is a bracelet or watchband.

13. The external element according to claim 12, wherein the bracelet includes two bracelet strands made of plastic materials, the light sensor being arranged on at least one of the two strands.

14. The external element according to claim 12, wherein the bracelet includes a plurality of links hinged to each other, the light sensor being arranged on at least one link.

15. The external element according to claim 12, wherein the bracelet is closed by a deployment buckle clasp, the light sensor being arranged on the clasp.

16. The external element according to claim 1, wherein the frame is a crown.

17. The external element according to claim 1, wherein the photochromic pigment is selected to react to ultraviolet radiation.

* * * * *

UNITED STATES PATENT AND TRADEMARK OFFICE
CERTIFICATE OF CORRECTION

PATENT NO. : 10,146,185 B2
APPLICATION NO. : 15/519041
DATED : December 4, 2018
INVENTOR(S) : Nicolas Francois Page 1 of 1

It is certified that error appears in the above-identified patent and that said Letters Patent is hereby corrected as shown below:

In the Specification

Column 4, Line 27, delete "SiO2" and insert --$SiO_2$--,

Column 4, Line 27, delete "Al2O3" and insert --$Al_2O_3$--,

Column 4, Line 27, delete "C)." and insert --C.--, and

In the Claims

Column 8, Line 13, Claim 1, delete "an," and insert --an--.

Signed and Sealed this
Twelfth Day of November, 2019

Andrei Iancu
*Director of the United States Patent and Trademark Office*